Jan. 8, 1924.
C. PEARSON
1,480,109
TONGUE TRUCK
Filed July 8, 1919
3 Sheets-Sheet 2
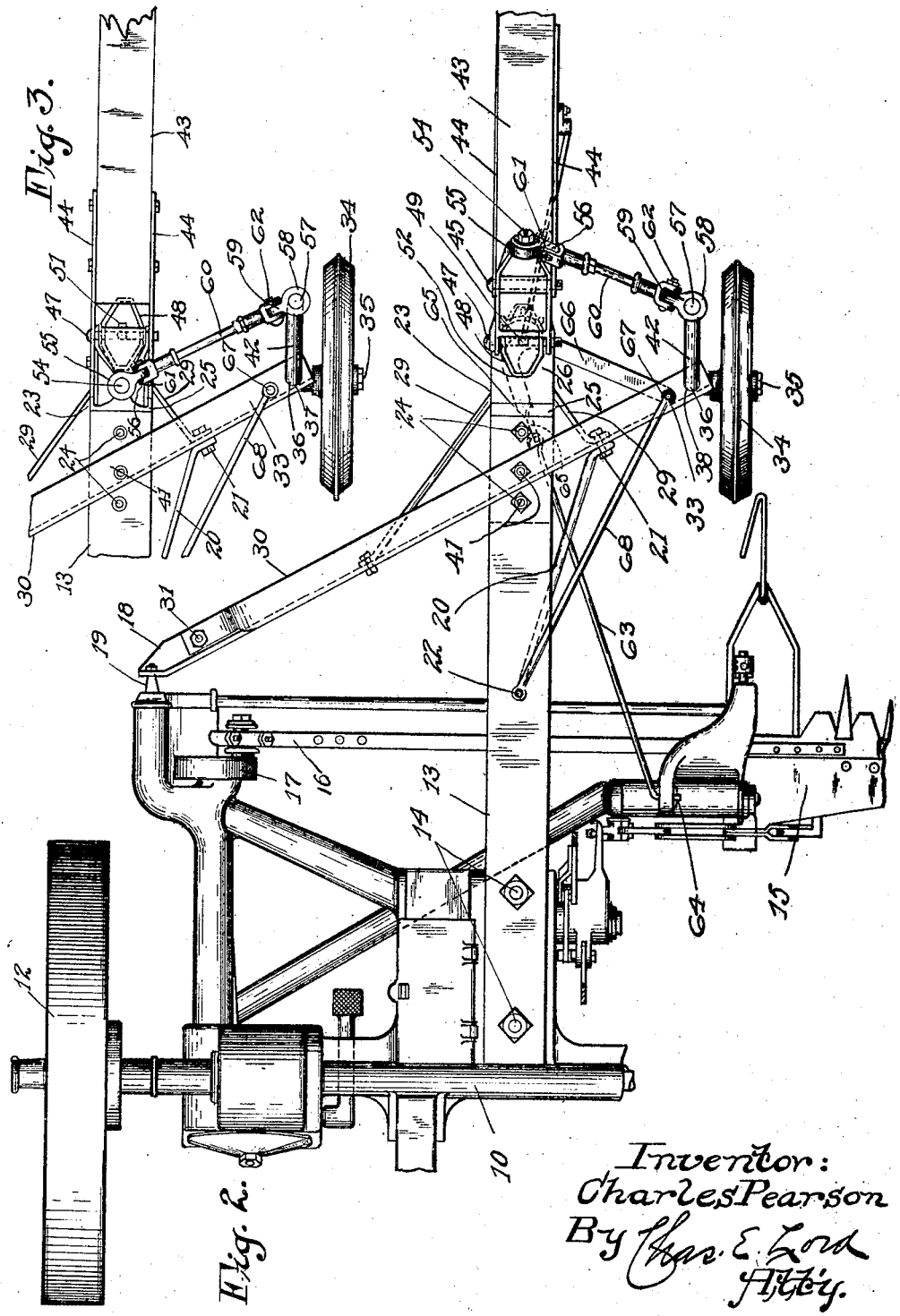
Inventor:
Charles Pearson
By Chas. E. Lord
Atty.

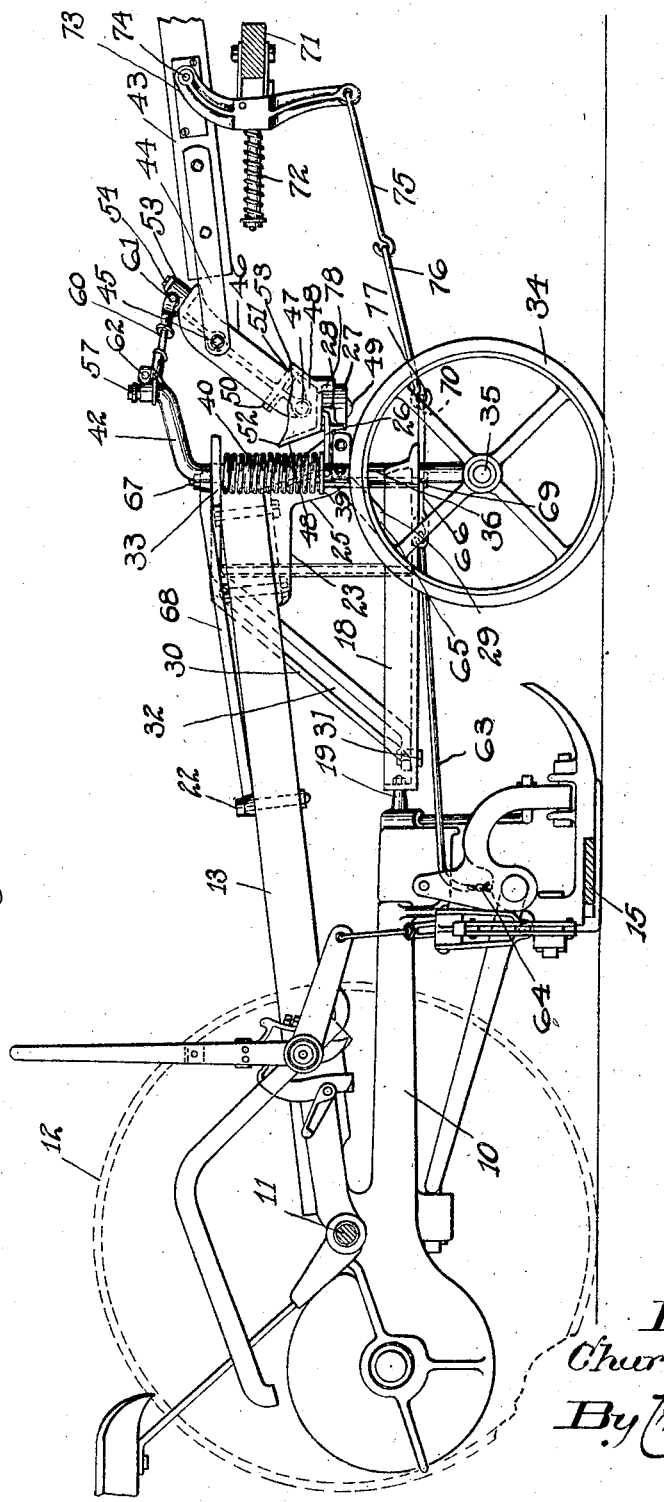

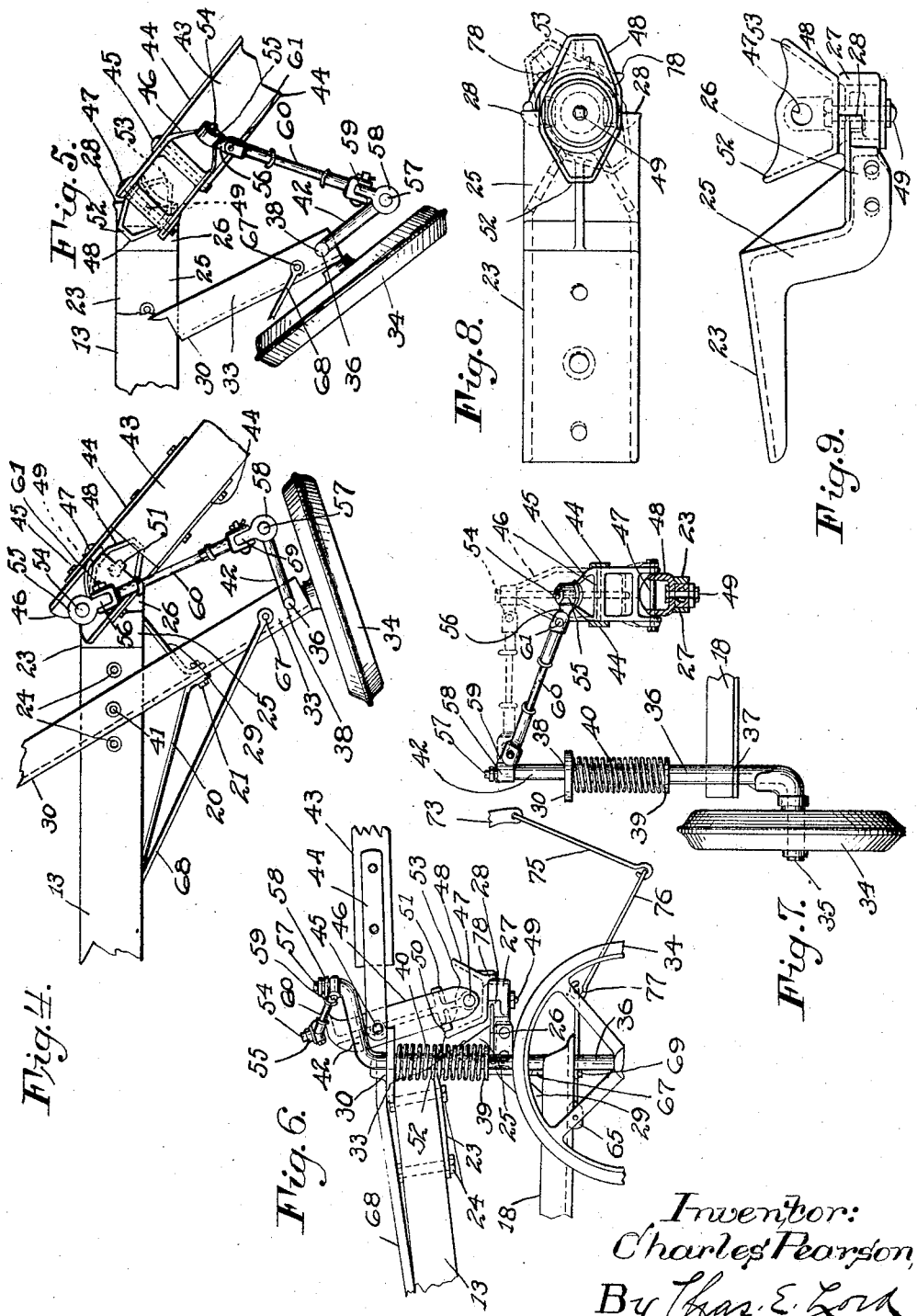

Patented Jan. 8, 1924.

1,480,109

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

TONGUE TRUCK.

Application filed July 8, 1919. Serial No. 309,354.

*To all whom it may concern:*

Be it known that I, CHARLES PEARSON, a citizen of the United States, residing at Chicago, in the county of Cook and State of Illinois, have invented certain new and useful Improvements in Tongue Trucks, of which the following is a full, clear, and exact specification.

This invention relates to tongue trucks, and more particularly to the type of tongue truck used in connection with agricultural machines, such as mowers, binders, etc.

The type of wheeled tongue truck in which the wheels are angled by the angling of the tongue on its vertical pivot ordinarily performs two functions; namely, it supports the tongue and facilitates the turning of the machine when the machine is being drawn forwardly. This last function is accomplished by mounting the axle of the tongue truck wheel in such a manner that it may be swung about a vertical pivot, this axle having a crank arm which is connected to the tongue in such a manner that the wheel of the truck will be swung through a greater angle than the tongue when the tongue is swung about its vertical pivot. As stated, this action takes place when the machine is being drawn forward and is being turned out of its normal path of movement. When, however, the ordinary tongue truck of the type just described is utilized and the operator desires to back the machine at an angle, the wheel of the tongue truck will be turned in the same direction as when it was being drawn forward, and this results in a jack-knifing action and cramps the truck and seriously hinders the backing and steering of the truck. In other words, the action which was accomplished when the machine was drawn forward and proved an advantage, proves a disadvantage when the machine is backed.

The object of the present invention is to facilitate the handling of an agricultural machine in such a manner that such a machine provided with a pivoted tongue may be drawn forward or backed with equal facility and under both conditions may be guided or steered in the proper direction.

Another object is to provide a tongue truck construction which constantly tends to align the pivoted tongue with the mower frame.

A further object is to provide a truck construction in which the vehicle is automatically aligned with the pivoted tongue in backing.

A further object is to provide a construction which will facilitate the guiding and steering of an agricultural machine when it is being backed by accomplishing the guiding of the machine in the direction of the longitudinal axis of the tongue.

A still further object is to provide a constant and uniform pull on the operative elements of the machine propelled in all positions of adjustment of the tongue.

With these and further objects in view, as will appear as the description proceeds, the present invention comprises a wheeled support for the tongue of an agricultural machine, the axle of the wheel being mounted for movement about a vertical pivot and the tongue being connected to the machine for movement about a vertical pivot. An arm is mounted on a vertical pivot axle of the wheel and a suitable connection is provided between this crank arm and the tongue, this connection acting in such a manner that when the machine is drawn forward and the tongue is angled, the wheel will be angled in a direction corresponding to the angle described by the tongue, but through a greater angle, whereas when the machine is backed the wheel of the tongue truck will be turned through an angle opposite to that through which the tongue is turned and through a lesser angle than that through which the tongue is moved. This difference in the direction of angling movement of the wheel is accomplished by connecting the crank arm carried by the vertical pivot axle of the wheel to the tongue through a movable member by means of which the effective crank arm between the vertical pivot of the tongue and the connecting member which joins the tongue and the crank arm carried by the vertical pivot of the wheel, is swung from one side of the tongue pivot to the opposite side thereof. In other words, and more specifically stated, the present embodiment of the invention comprises a wheel mounted for movement about a vertical axis, the vertical axis having a crank arm, a tongue mounted for movement about a vertical pivot, and a link connected at one end to the crank arm carried by the vertical pivot of the wheel and at its opposite end to a member movable from one side of the tongue pivot to the oposite side when the tongue is moved from the position in which it is located in drawing the machine to the position assumed when the machine is being pushed or backed thereby.

One embodiment of the invention is illustrated in the accompanying drawings, and in these drawings—

Fig. 1 illustrates in side elevation an agricultural machine having my improved tongue truck attached thereto;

Fig. 2 is a fragmentary top plan view of the construction shown in Fig. 1;

Fig. 3 is a top plan view showing my improved tongue truck in a position assumed when the machine is backed and the tongue is in alignment with the draft member or stub tongue of the trailing machine;

Figs. 4 and 5 are top plan views illustrating, respectively, the position taken by the tongue truck mechanism when the tongue is angled and the machine is backed, and when the tongue is angled and the machine is drawn forwardly;

Fig. 6 is a detail view in side elevation illustrating the improved tongue truck in the position assumed when the machine is backed;

Fig. 7 is a transverse vertical sectional view of the construction shown in Fig. 1, looking toward the rear of the machine; and Figs. 8 and 9 illustrate in top plan and side elevation, on an enlarged scale, the construction of the stub tongue bracket and the tongue hinge pivot member used in connection with my improved tongue truck.

In order to illustrate a practical embodiment of the invention, the improved tongue truck has been shown in connection with a mower of standard type, but it should be understood that this truck is equally well adapted for use in connection with other machines, such as grain binders, corn binders, etc. The improved machine illustrated comprises a frame 10 carried by an axle 11 which, in turn, is supported by suitable traction wheels 12. A stub tongue 13 is secured by means of bolts 14 to the frame of the mower and projects forwardly therefrom. A cutter bar 15 of the ordinary construction is carried by the mower frame and is driven by a pitman 16 which is suitably connected through a flywheel 17 and the usual driving shafts to the traction wheels 12. The tongue truck, wherein the invention claimed in this application resides, is connected to the front end of the stub tongue in a manner which will next be described.

A brace member 18 is secured at 19 to the frame of the mower, and a strengthening rod 20 is secured at one end to the member 18, as shown at 21, and at its opposite end to the stub tongue 13 as illustrated at 22. A bracket 23 is secured by bolts 24 to the front end of the stub tongue 13 and is provided with a downwardly projecting portion 25 and a forwardly projecting portion 26, the latter portion having a cylindrical bearing 27 formed thereon. Laterally projecting lugs or stops 28 are also carried by the portion 26 of the bracket, and are preferably formed integral therewith, the function of these lugs 28 being hereinafter described. Strengthening rods 29 are interposed between the bracket 23 and the brace member 18, as clearly illustrated in Figs. 1 and 2. A brace member 30 is secured at 31 to the member 18 and is inclined upwardly, as shown at 32, the upper portion 33 of this member being disposed parallel to the brace member 18 and in vertical alignment therewith. A castor wheel 34 is pivotally mounted on an axle 35 which in turn is formed integral with or suitably secured to a vertical spindle 36 which extends upwardly through suitably aligned apertures 37 and 38 formed respectively in the members 18 and 30. A collar 39 is secured to the vertical spindle 36 and a spring 40 is interposed between the member 30 and the collar 39, this spring forming a resilient support for the frame 10 and stub tongue 13 of the mower frame. A bolt 41 secures the brace member 30 to the stub tongue, as illustrated in Fig. 1, and therefore it will be seen that the members 18—30 and the connecting braces or strengthening rods are rigidly connected to and form a part of the mower frame, the stub tongue 13 being also securely bolted to the frame. The vertical spindle 36 which carries the castor wheel 34 is provided on its upper end with a crank arm 42 by means of which the castor wheel may be angled when the tongue which is pivoted to the stub tongue 13 is angled, and these connections will next be described.

A tongue 43 is provided for drawing or backing the vehicle or machine, this tongue having secured thereto rearwardly extending straps 44 which are pivotally connected on the horizontal axis 45 to a hinged member 46 through which the tongue is connected to the stub tongue and frame of the trailing machine. The hinged member 46 is pivoted at 47 on a horizontal pivot to a bracket or socket member 48 which in turn is swiveled on a vertical pivot 49 in the cylindrical bearing 27 formed in the bracket 23. The hinged member is provided with laterally extending lugs 50 and 51 which engage with stops 52—53 formed integral with the bracket 48, thereby limiting the pivotal movement of the hinged member 46 about its horizontal pivot 47.

When a forward pull is exerted on the tongue 43, the hinged member 46 assumes the position shown in Figs. 1, 2 and 5, but when the machine is backed or a rearward force is exerted on the tongue, the pivot member assumes the position shown in Figs. 3, 4 and 6. The object of connecting the tongue 43 to the stub tongue of the trailing machine through an intermediate movable member, such as 46, is to reverse the direction in which the castor wheel 34 is angled when force exerted on the tongue is changed from a pulling to a pushing force, or, in other words, when the machine is changed from a forward to a rearward direction of movement. This reversing of the direction of angling of the castor wheel 34 is accomplished in a manner which will next be described.

The hinged member 46 is provided at its upper end with a cylindrical bearing portion 54 on which is swiveled a sleeve 55 having an outwardly projecting apertured lug 56 secured thereto, or formed integral therewith. The crank arm 42 carried by the upper end of the vertical spindle 36 is offset, as shown at 57, forming a vertical cylindrical bearing on which is pivoted a sleeve 58 having an outwardly extending apertured lug 59. The lug 59 is connected to the lug 56 by means of a link 60 which is pivoted, as shown at 61, to the lug 56 and as shown at 62 to the lug 59. From this description it will be seen that any angling movement of the tongue 43 about the vertical pivot 49 is communicated to the crank arm 42 of the spindle 36 by the link 60. A further description of the operation of these members will be given at the end of the specification.

In working out my present construction of tongue truck I have also provided means whereby a constant and uniform pull is exerted on the operative elements carried by the trailing machine in all positions of angular adjustment of the tongue carried by the tongue truck. This is accomplished by providing separate draft connections for the operative elements, and these connections comprise a link 63 which is pivoted, as shown at 64, to the cutting apparatus, and at its opposite end is connected to the rear end 65 of an angular member 66 which is pivotally secured to the brace member 18 by a vertical rod 67. The upper end of the rod 67 is rigidly connected to the stub tongue 13 by means of a brace rod 68, the rear end of the brace rod being secured to the stub tongue by the bolt 22 above described. A nut 69 carried by the lower end of the rod 67 secures the member 66 against removal from said rod, as illustrated in Fig. 1. The member 66 is provided with a vertical aperture 70 which is disposed in vertical alignment with the pivot bolt 49 on which the hinge member 46 is swiveled. An evener 71 is resiliently connected by means of a spring connection 72 to an arm 73 which is pivoted at 74 to the tongue 43, and the lower end of the arm 73 is connected to the member 66 through a pair of links 75—76, the rear link 76 being provided with a hooked end 77 which passes through the aperture 70 formed in the member 66. Whenever a forward pull on the evener 71 is exerted by the draft elements, this pull is communicated through the links 75 and 76 to the member 66 and through this member is communicated to the operative elements of the trailing device through the link connection 63. In view of the fact that the connection between the links 75 and 76, and the member 66 is disposed in alignment with the vertical pivot on which the tongue 43 is angled, it is evident that the angular position of the tongue will have no effect on the pull exerted on the operative elements of the trailing machine, and therefore that this pull will be constant and uniform in all positions of angular adjustment of the tongue. Means has also been provided for limiting the angular movement of the tongue 43 about its vertical pivot 47, this means comprising a pair of lugs 78 preferably formed integral with bracket 48 and adapted to contact with the lugs 28 formed on the front ends of the bracket 23, as recently described. From the illustration in Fig. 8, it will be seen that the angular movement of the tongue 43 is limited in both directions by means of the engagement of the lugs 28 with the lugs 78.

A brief description of the operation of the above described structure will now be given.

When the machine is drawn forwardly, or in other words, when a forward force is exerted on the tongue 43, the hinge member 46 will assume the position illustrated in Fig. 1, the lug 51 carried by the hinge member engaging the stop 53 formed on the bracket 48. If the machine is drawn directly forward, the tongue 43 will be maintained in alignment with the stud tongue 13, and the castor wheel 34 will also be maintained parallel with the line of draft as shown in Fig. 2. When, however, the machine is being drawn forward and the tongue 43 is swung about the vertical pivot 49, the link connection 60 between the upper end of the hinge member 46 and the upwardly extending portion of the crank 42 will communicate the angular movement of the tongue to the vertical spindle 36 which carries the castor wheel and will turn the castor wheel through an angle in the same direction of movement as that in which the tongue 43 is moved. The length of the crank arm 42 is usually so determined that the castor wheel will be thrown through a slightly greater angle than that through which the tongue is moved, since in this way the turning of the machine may be more quickly accomplished and the tongue 43 and the stub tongue 13 will tend to more quickly be aligned with each other. With the usual tongue truck, in which the wheels are angled with the tongue which is carried by the tongue truck, the above result is accomplished when the machine is drawn forwardly, but this type of tongue truck is objectionable since, as pointed out earlier in the specification, when the machine is backed and the tongue of the tongue truck is angled the castor wheel will be turned through the same angle of movement as it would be if the machine were being drawn forward. Turning the castor wheel through the same angle of movement in backing the machine results in a jack-knifing action, and because of this a great difficulty is experienced in trying to back the machine which is provided with the type of tongue truck described, and it is usually necessary to back the machine by pulling rearwardly on the frame of the mower or the trailing machine, and not by pushing on the tongue truck. This jack-knifing action, however, has been overcome in the present invention by means of the hinged member 46. When the machine is to be backed, a rearward force is exerted on the tongue 43 and this rearward force first swings the hinged member 46 in an anti-clockwise direction about its pivot 47, the member being swung to the position illustrated in Figs. 3, 4 and 6. When the member 46 is swung to the position shown in these figures, the upper end 54 of the hinge member is swung over to the opposite side of the vertical pivot 49, and therefore when the tongue is angled a pulling force will be exerted on the link 60 instead of a pushing force which was exerted on this link in the former position of adjustment of the hinged member 46. In this connection attention is directed to the Figs. 4 and 5 wherein the two positions of adjustment of the member 46 are clearly illustrated, and the tongue 43 is shown in practically the same position of angular adjustment. In view of the difference of the direction of the force applied to the link 60, the castor wheel will be turned through an angle of movement in a direction opposite to that described when the forward force was exerted on the tongue, and therefore in this case, as in the other case, the castor wheel will tend to bring the tongue 43 and the stub tongue 13 into alignment with each other; in other words, by the use of a tongue truck designed, as above described, the tongue of the tongue truck will tend to be aligned with the stub tongue of the trailing machine, whether the machine is being drawn forwardly or backed. As above pointed out in the specification, means has also been provided for always maintaining a uniform and constant pull on the operative elements of the machine in all positions of angular adjustment of the tongue, this being accomplished by providing a separate draft connection for these elements and by exerting the force applied to this draft connection through a pivot disposed in alignment with the vertical pivot of the tongue 43.

It will be evident to those skilled in the art that other means for accomplishing this same result could be used, and it should be understood that the hinged member 46 has been illustrated merely to disclose one means for accomplishing the desired result, and that the invention is not limited to the particular construction shown and described.

As above stated, modification in the construction and arrangement of the various parts may be made, and the improved construction of tongue truck may be used in connection with various other machines and is not limited in any way to the particular machine illustrated. It is therefore contemplated that all such changes and modifications shall be covered within the scope and spirit of the appended claims.

I claim—

1. In combination, a wheeled vehicle, a draft member carried thereby, a tongue pivoted to said draft member for longitudinal and lateral movement, a wheeled support for said tongue and operative connections between said support and said tongue for automatically aligning said draft member with said tongue in backing.

2. In combination, a wheeled vehicle, a draft member carried thereby, a tongue pivotally connected to said draft member, and means including a link operatively connected to said tongue for returning to alignment said tongue with said draft member of said vehicle when said vehicle is being drawn forwardly or is being backed.

3. In combination, a wheeled vehicle, a draft member carried thereby, a wheel supporting said draft member, a tongue pivoted to said draft member, and an operative connection between said tongue and wheel including means for automatically aligning said vehicle with said tongue in backing.

4. In combination, a wheeled vehicle, a draft member carried thereby, a tongue pivoted to said draft member, a castor wheel support for said tongue, operative connections between said support and said tongue, including means for reversing the direction of angular movement of said wheel with respect to said tongue as the direction of force exerted on said tongue in a longitudinal direction is reversed.

5. In combination, a wheeled vehicle, a draft member carried thereby, a wheeled support for said draft member, a tongue pivoted to said draft member and movable bodily with respect thereto, and means for reversing the angularity of said wheel support by the bodily movement of said tongue.

6. In combination, a wheeled vehicle, a draft member carried thereby, a wheel supporting said draft member, a tongue pivoted to said draft member, and an operative connection between said tongue and wheel including means permitting bodily movement of said tongue for automatically aligning said vehicle with said tongue in backing.

7. In combination, a wheeled vehicle, a draft member carried thereby, a wheeled support for said draft member, a tongue pivoted with respect to said draft member and longitudinally movable with respect thereto for controlling the reversibility of the angle of said wheel support, and means for operatively connecting said wheeled support to said tongue.

8. In combination, a wheeled vehicle, a draft member carried thereby, a tongue, and means including a link pivotally connected with said tongue and with said draft member for returning to alignment said tongue with said draft member when said vehicle is being drawn forwardly or is being backed.

9. In combination, a wheeled vehicle, a draft member carried thereby, a castor wheel support resiliently connected to said draft member, a hinged member pivotally connected to said draft member, a tongue pivoted to said hinged member and operative steering connections between said hinged member and said castor wheel.

10. In combination, a wheeled vehicle, a draft member carried thereby, a bracket carried by said draft member, a hinged member operatively connected to said bracket through vertical and horizontal pivots, a tongue pivotally connected to said hinged member, a castor wheel support for said tongue and operative steering connections between said castor wheel and said hinged member.

11. In combination, a wheeled vehicle, a draft member carried thereby, a tongue, a wheel supporting said draft member, a crank arm for controlling the angularity of said wheel, a hinged member pivoted to said draft member and connected to said tongue, and means including a connection between said hinged member and said crank arm for controlling the angularity of said wheel.

12. In combination, a wheeled vehicle, a draft member carried thereby, a tongue, a wheel supporting said draft member, a crank arm for controlling the angularity of said wheel, a hinged member pivoted to said draft member and connected to said tongue, means including a connection between said hinged member and said crank arm and means for actuating said hinged member about its pivot for reversing the angularity of said wheel.

13. In combination, a wheeled vehicle, a draft member carried thereby, a tongue, a castor wheel connected to said draft member and vertically swiveled with respect thereto, a movable member movable with respect to said tongue and said draft member, and steering connections between said movable member and said castor wheel.

14. In combination, an agricultural machine including a frame and a draft member, a resiliently wheeled support for said frame, a tongue, a hinged member movable in substantially a vertical plane and connecting said tongue and said draft member, and means connecting said wheel support with said operative connections in such a manner that as the longitudinal force applied to said tongue is reversed, the angular location of said wheeled support with respect to said draft member will be reversed.

15. In combination, a wheeled vehicle, a draft member carried thereby, a wheeled support for said draft member, a tongue pivoted to said draft member, connections between said tongue and said wheeled support for angling said wheeled support, and means for moving said connections from one side of said pivot to the other side of said pivot for controlling the angularity of said wheeled support.

16. In combination, a wheeled vehicle, a draft member carried thereby, a wheeled support for said draft member, a tongue pivoted to said draft member, connections between said tongue and said wheeled support for angling said wheeled support, and means for swinging said connections rearwardly of the pivotal connection of said tongue and draft member for controlling the angularity of said wheeled support.

17. In combination, a wheeled vehicle, a draft member carried thereby, a wheeled support for said draft member, a tongue pivoted to said draft member for angling said wheeled support with respect to said draft member in turning and means for reversing the angularity of said wheeled support with respect to said draft member by the longitudinal movement of said tongue.

18. In combination, a wheeled vehicle, a draft member carried thereby, a wheeled support for said draft member, a tongue pivoted to said draft member for angling said wheeled support with respect to said draft member in turning and means for reversing the angularity of said wheeled support with respect to said draft member by the bodily movement of said tongue.

19. In combination, a wheeled vehicle, a wheel for guiding said vehicle, a tongue operatively connected to said vehicle for longitudinal movement with respect thereto, means connecting said wheel with said tongue for angling said wheel, and means for reversing the angle of said wheel with respect to said tongue by the longitudinal movement of said tongue.

In testimony whereof I affix my signature.

CHARLES PEARSON.